United States Patent Office 3,014,904
Patented Dec. 26, 1961

3,014,904
18-OXYGENATED PREGNANE COMPOUNDS AND PROCESS FOR PREPARING SAME
Tadeus Reichstein, Weissensteinstr. 22, Basel, Switzerland, Albert Wettstein, Georg Anner, Jean-Rene Billeter, and Karl Heusler, Basel, Robert Neher, Binningen, Julius Schmidlin, Basel, Hellmut Ueberwasser, Riehen, and Peter Wieland, Basel, all of Switzerland, assignors to said Tadeus Reichstein
No Drawing. Filed Oct. 28, 1958, Ser. No. 770,006
Claims priority, application Switzerland Jan. 15, 1954
27 Claims. (Cl. 260—239.55)

This is a continuation in part of application Serial No. 585,168, filed May 16, 1956 (now abandoned) which is in turn a continuation in part of application Serial No. 480,061, filed January 5, 1955, now Patent No. 2,904,545 issued September 15, 1959.

The highly active hormone of the suprarenal gland which is responsible for the regulation of the mineral metabolism in the human body is known to be a pregnene compound of the following formulae which obviously represent an equilibrium

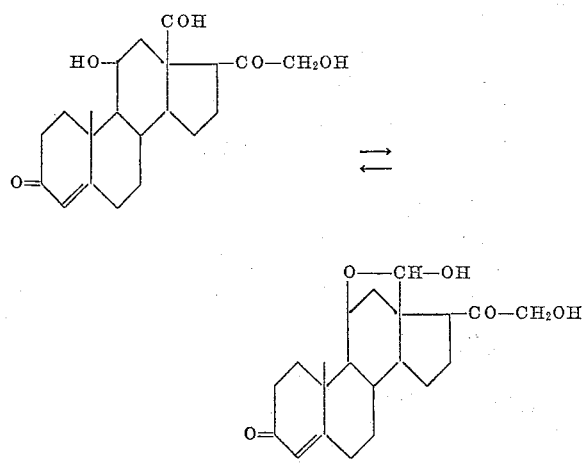

Since this important hormone is so far only available by a tedious extraction procedure from suprarenal glands of animals and can only be obtained in very low yield (40 to 95 mg. from 1000 kilos of fresh beef adrenals), a synthesis of this hormone and closely related 18-oxygenated hormones (e.g. the 18-hydroxy compound corresponding to aldosterone viz. $\Delta^4$-3:20-dioxo-11$\beta$:18-21-trihydroxypregnene i.e. 18-hydroxy-corticosterone which shows a similar high physiological activity) from readily available compounds either from other naturally occurring steroids or a total synthesis is of extraordinary technical importance.

More particularly the invention is concerned with compounds of the formula

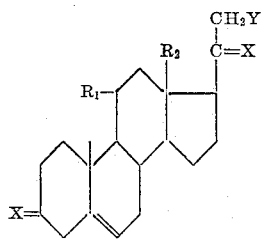

wherein X stands for a ketalized oxo group Y for a member of the group consisting of a hydrogen atom and a free and esterified hydroxyl group, $R_1$ for a free, esterified and etherified hydroxyl group and $R_2$ for a member of the group consisting of a free or esterified hydroxymethyl group, a free or acetalized aldehyde group and a free or lactonized carboxyl group. Also included are those compounds which are acylated in the 21- or 18,21-positions. Moreover the invention is directed to a process for the preparation of these compounds and to a process for their conversion into aldosterone or 18-hydroxy-corticosterone.

The ketals described above may be converted to aldosterone and to 18-hydroxy-corticosterone in the following way: When Y is a free or esterified hydroxyl group, $R_2$ a free or acetalized aldehyde group or a free or esterified hydroxymethyl group, the said products are obtained by splitting the ketals and ester groups. When $R_2$ however is a free or lactonized carboxyl group, the compounds are first treated with a reducing agent, whereby the carboxyl group is reduced either to the aldehyde group or to the hydroxy-methyl group depending on the amount of reducing agent used. The 21-desoxy compounds may similarly first be converted to 21-desoxy-aldosterone or the 21-desoxy-18-hydroxy-corticosterone and these compounds may be in turn converted to aldosterone, 18-hydroxy-corticosterone or their derivatives according to our copending application Serial No. 770,015, filed October 28, 1958. Such conversion consists in reacting the 21-desoxy-compounds, preferably after protection of the keto group in 3-position by ketalization and of the functional group in 13-position by esterification or etherification with an oxalic acid ester, for example, with dimethyl oxalate in the presence of about 1.5 molar equivalents of dry sodium methoxide in benzene solution at room temperature, treating the 21-oxalo acid ester in the form of its enol salt, e.g., its sodium salt in methanol with a halogen such as iodine, subjecting to acid cleavage the 21-halogen-21-oxalo acid ester formed by treatment with about 1 molar equivalent of sodium methoxide in methanol at 0° C. for several hours and converting the 21-halides into 21-esters by reaction with a carboxylic acid salt, e.g. with potassium acetate in acetone solution. Finally ester-, ether- and ketal-groupings are hydrolized in known manner.

A process for the preparation of compounds of the present invention includes treating compounds of the formula

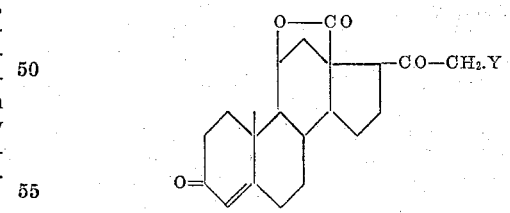

wherein Y is a free or esterified hydroxyl group or a hydrogen atom, with ketalizing agents and treating the compound of the formula

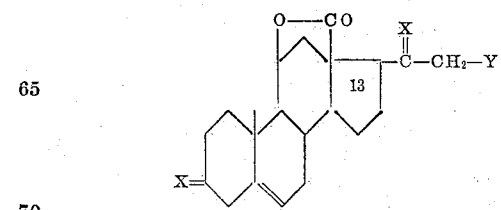

thus obtained, in which X represent ketalized oxo groups, and Y a free or esterified hydroxyl group or a hydrogen atom with a reducing agent.

It has also been unexpectedly found that by a suitable choice of the reaction sequence the yields in the final conversion of the aldosterone ketals or their 21-esters into aldosterone or aldosterone-21-esters can be many times increased. Thus, when in an (18→11)-lactone of a Δ⁵-3:20-bis-(alkylenedioxy) - 11β:21 - dihydroxy-pregnene-18-acid or a 21-ester thereof the lactone group is reduced with lithium-aluminum hydride to the (18→11)-cyclo-hemiacetal, and the resulting product is treated with an acylating agent and, if desired, after hydrolysis of the 18-acyloxy group, the protected oxo groups in 3- and 20-position are liberated by acid hydrolysis and if desired the 21-acyloxy group hydrolyzed under alkaline conditions, a far greater amount of final product is obtained, than in the case when the acylating step is omitted before the acid treatment.

The reduction of the carbonyl group of the lactone at position-13 according to the present invention is advantageously carried out with a complex light metal hydride for example lithium aluminum hydride in an inert anhydrous-solvent. An especially suitable solvent is tetrahydrofurane alone or mixed with a different ether such as diethylether or dioxane. Depending upon the amount of reducing agent used, the lactone grouping is reduced to a cyclosemiacetal or a hydroxy carbinol, the latter being formed when an excess of complex hydride is used, whereas with decreasing amounts of hydride, for instance ¼ or ⅓ of a molar equivalent of lithium aluminum hydride, the amount of semicycloacetal obtained is increased. For each free hydroxyl group present in the substance to be reduced an additional fourth of a molar equivalent of hydride must be added. Thus in the case of the 21-hydroxy-lactone a total amount of about one half of a molar equivalent of lithium aluminum hydride must be used.

The reaction products can be isolated in the customary manner and reacted with reactive derivatives of carboxylic acids, for example, acid anhydrides or acid halides in the presence of an acid-binding agent, such as pyridine. It is especially advantageous, however, to acylate the metal salt produced in the reduction with lithium-aluminum hydride directly with an acid anhydride or halide, since by this means the formation of undesired secondary products is avoided to a far reaching extent. In this manner from compounds having a 21-hydroxyl function the 18-21-diacylates are obtained in very good yield. From 21-unsubstituted compounds 18-mono-acylates are formed. In all of the compounds having an acelated 11,18-cyclohemiacetal grouping the 18-acyloxy group is extraordinarily easily hydrolyzable, for example even by heating with aqueous solvents such as acetone, methanol and so on.

In the fully reduced 11β,18-dihydroxy compounds, it is possible to acylate the 11β-hydroxyl group as well. For this purpose there are especially suitable highly reactive acylating agents such as trifluoroacetic anhydride or a mixed anhydride of formic acid and acetic acid. There may thus be formed 18,21-diacylates and 21-monoacylates of the aldosterone-3,20-diketals, the 18-monoacylates of the 21-desoxy-aldosterone 3,20-diketals, the 18-monoacylates, the 18,21-diacylates and the 11β,18,21-triacylates of the 18-hydroxy-corticosterone- and 21-desoxy-corticosterone-18-hydroxy-corticosterone-3,20-diketals.

For the acylations as above referred to reactive derivatives of saturated or unsaturated aliphatic or cycloaliphatic, of aromatic, araliphatic or heterocyclic carboxylic acids can be used; for example alkanoic (especially lower alkanoic) or alkenoic acids, such as formic acid, acetic acid, trifluoracetic acid, propionic acid, the butyric acids, valeric acid, such as n-valeric acid or trimethyl acetic acid, the caproic acid, such as β-trimethyl propionic acid, the enanthic, caprylic, pelargonic, capric or undecyclic acids, undecylenic acid, lauric, myristic, palmitic or stearic acids; oleic acid, also for example, the cyclopentyl, cyclohexyl or phenyl-acetic acids or -propionic acids, benzoic acid, hexahydrobenzoic acid, furane-2-carboxylic acid or nicotinic acids, or also of dicarboxylic acids, such as oxalic, succinic or glutaric acids, of substituted carboxylic acids, such as β-ketocarboxylic acids, for example acetoacetic, propionylacetic, butyryl-acetic or caproylacetic acid or of amino acids.

It was already known that of the two ketals in 3- and 20-position that are derived from Δ⁴-3:20-dioxo-21-acyloxy-pregnene compounds, the ketal group in 3-position is more easily split off, for example even with dilute acetic acid. The splitting of the 20-ketal in these compounds could hitherto be carried out, however, only using mineral acids, for example sulfuric acid in aqueous solvents, such as aqueous methanol. Although in the case of 18-unsubstituted pregnanes this process has been used with good results, in the case of aldosterone-3:20-diketals it gives very bad yields, since the free aldosterone is converted by mineral acids to a considerable extent into inactive products. It is found that in the case of the 3:20-diketals of the aldosterone-18:21-diacylates or -21-monoacylates concerned in the present case, in a surprising manner both ketal radicals can be split off even by simple heating with aqueous carboxylic acids, especially aliphatic carboxylic acids, for example aqueous formic acid, acetic acid, propionic acid or the like. In this manner the corresponding aldosterone-21- monoacylates are obtained in very good yield. Since in the process of the invention together with ketal splitting an 18-O-acyl radical is hydrolysed at the same time, it is possible to use as starting materials diketals of 18:21-di-O-acyl- or 21-O-monoacylaldosterone or mixtures of mono- and diacyl-compounds.

The hydrolysis of the resulting aldosterone-21-monoacylates only takes place in good yield under specific conditions, preferably with the aid of alkaline agents. However even using the latter agents the yield of pure aldosterone under the conditions customary for the hydrolysis of similarly constituted 18-unsubstituted 20:20-ketol esters is unsatisfactory. It has in fact been found that surprisingly in the case of aldosterone an isomerization takes place on the carbon atom 17 even under mild conditions. In order to obtain high yields in the hydrolysis of aldosterone-21-monoaceylates it is therefore necessary to select conditions under which the hydrolysis itself is as complete as possible but isomerization is avoided. This effect is achieved primarily by shortening the usual reaction time. The latter is dependent upon the pH of the reaction medium and the reaction temperature. At temperatures of 15–25° C. in the case of the application of alkali metal carbonates in homogeneous solution only a few minutes suffice, while using alkali metal bicarbonates a few hours are required.

The 18:21-diacylates and 21-monoacylates of aldosterone-3:20-bis-alkylene ketals obtained according to the present process are new. They constitute racemic or optically active compounds. They form the most valuable intermediate products to date for the manufacture of the corresponding aldosterone-21-monoacylates and of the free aldosterone.

In the 3,20-diketals of 18-hydroxy-corticosterone and its 21-desoxy derivative and their esters the ketals group can be also split by acid hydrolysis, whereby 18-hydroxy-corticosterone or its esters, for instances its 11β-monoester, 21-monoester, 18-monoester or 18,21-diester and 11,18,21-triester or e.g. 18-monoesters of 21-desoxy-18-hydroxy-corticosterone are obtained.

The starting materials are prepared according to the methods described in the examples and in our copending application Serial No. 770,015, filed October 28, 1958 mentioned above and by the process described in our copending application Serial No. 769,996, filed October 28, 1958, Serial No. 585,143, filed May 16, 1956, and Serial No. 585,167, filed May 16, 1956. The process of the last three mentioned applications can be illustrated by the following reaction scheme:

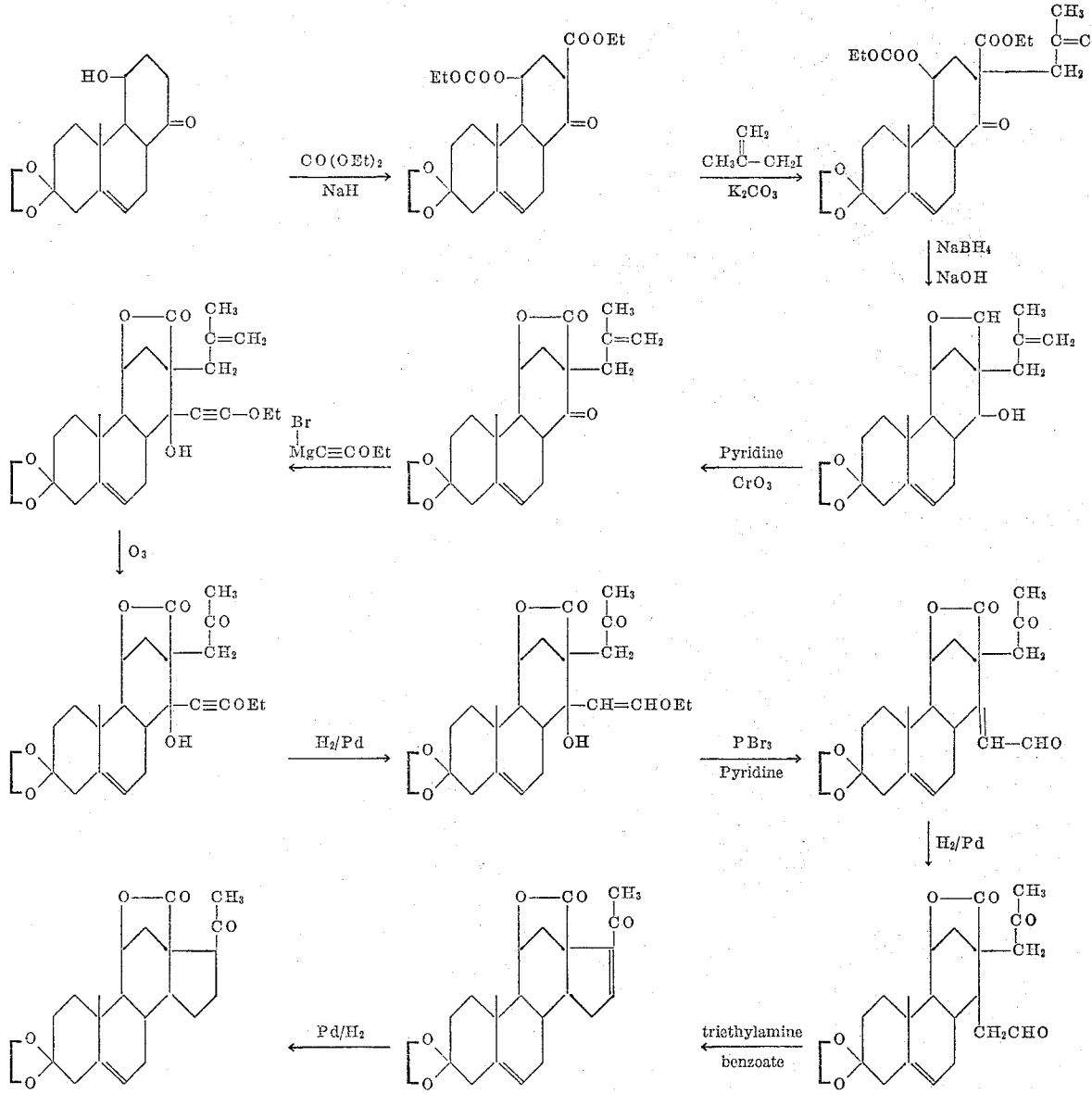

The (18→11β)-lactone of Δ⁴-3:20-dioxo-11β-hydroxy-21-acetoxy-pregnene-18-acid can also be prepared by oxidation of aldosterone 21-monoacetate with chromium trioxide in acetic acid as described in Example 1 hereafter.

The invention also comprises modifications of the above process in which only some of the operations are carried out, and these if desired in a different sequence, or in which there is used as starting material an intermediate product of the complete process and the remaining process stages are carried out.

The following examples illustrate the invention:

*Example 1*

1.12 mg. of the 18:11-lactone of Δ⁴-3:20-dioxo-11β:21-dihydroxy-pregnene-18-acid are dissolved in 5 cc. of ethylene dichloride. After the addition of a small crystal of p-toluene sulfonic acid and a drop of pure ethylene glycol, ethylene dichloride is slowly distilled off. By dropwise addition of new solvent, the volume of the reaction solution is maintained constant. After 4 hours the content of the flask is washed twice with 1 cc. of a 1% sodium carbonate solution each time and twice with 1 cc. of water each time and the solution dried and evaporated under vacuum. The residue constitutes the 18:11-lactone of the Δ⁵-3:20-diethylene-dioxy-11β:21 - dihydroxy - pregnene-18-acid, which is dissolved without purification in 5 cc. of tetrahydrofurane. After cooling to —10° to —15° C. there is added dropwise with stirring a tetrahydrofurane solution of lithium-aluminum hydride such as is calculated for the reduction of the lactone to the semiacetal group while taking into account the 21-hydroxyl group. The cooling bath is then removed and the temperature allowed to rise to about 20° C. The tetrahydrofurane solution is diluted with 50 cc. ether and washed consecutively with 0.1 N-sulfuric acid and water, dried and evaporated under vacuum. The crude Δ⁵-3:20-diethylene-dioxy-11β:21-dihydroxy - 18 - oxo-pregnene of the formula:

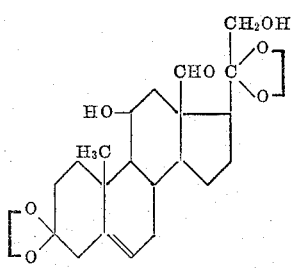

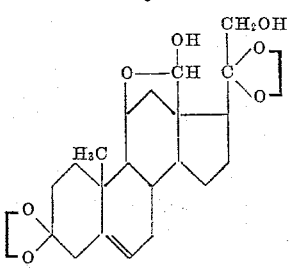

is dissolved without purification in 50% acetic acid and allowed to stand over night at about 20° C. The reaction mixture is extracted twice, each time with 5 cc. of chloroform-ether (1:3) and the extracts are washed twice, each time with 1 cc. of water, dried over sodium sulfate and evaporated under vacuum. From the crude product which results, aldosterone can be obtained by chromatography.

If an excess of lithium-aluminum hydride is used in the above reduction, then after the ketal splitting there is obtained the $\Delta^4$-3:20-dioxo-11$\beta$:18:21 - trihydroxy - pregnene of the formula:

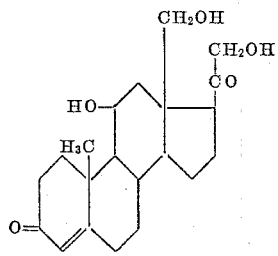

The starting material may be prepared by total synthesis as indicated in Example 4 and is identical with the material obtained from aldosterone in the following manner:

1.267 mg. of aldosterone monoacetate of melting point 190–192° C. are dissolved in 0.12 cc. of glacial acetic acid and treated with 0.01 cc. of 2% chromium trioxide glacial acetic acid solution. After 15 minutes the chromium trioxide is consumed and a further 0.01 cc. of the same solution is added. After 3½ hours a little methanol is added to the reaction solution and the whole to stand for a further hour and then evaporated under vacuum at 30° C. The residue is taken up in chloroform-ether (1:3), washed at 0° C. twice with 0.15 cc. of N-sodium carbonate solution each time and twice with 0.1 cc. of water each time, the chloroform-ether solution dried and evaporated under vacuum. The neutral portion is recrystallized twice from acetone-ether and washed with ether and pentane. The melting point of the resulting 18:11-lactone of $\Delta^4$-3:20-dioxo-11$\beta$-hydroxy - 21 - acetoxy-pregnene-18-acid which occurs in colorless leaflets (also in part in clusters) is 187–190° C.

After further crystallization from a mixture of chloroform and ether this compound melts at 198–199° C. (flat needles) $[\alpha]_D^{26} = +117.2°$ (c.=0.6186 in chloroform).

For hydrolysis of the acetate group, 6.3 mg. of the above compound are dissolved in 1 cc. of methanol, a solution of 7 mg. of potassium bicarbonate in 0.24 cc. of water are added and the whole is allowed to stand at 18° C. for 48 hours. After acidification with dilute hydrochloric acid it is extracted with a mixture of chloroform and ether (1:3), the extract washed first with water, then with sodium bicarbonate solution and again with water, dried, and the solvent evaporated under reduced pressure. The neutral portion so obtained amounts to 3.5 mg. and is the 18:11-lactone of $\Delta^4$-3:20-dioxo-11$\beta$-21-dihydroxy-pregnene-18-acid. After recrystallization from a mixture of acetone and ether it forms small grains which melt at 203–218° C.

*Example 2*

1.116 g. of the (18→11) lactone of d,l-$\Delta^5$-3,3;20,20-bis-ethylene dioxy-11$\beta$,21-dihydroxy-pregnene-18-acid are covered with 37.5 cc. anhydrous tetrahydro-furane and 25.3 cc. of a 1.0 molar solution of lithium aluminum hydride in tetrahydrofurane and the mixture is stirred for 122 hours at room temperature in an atmosphere of nitrogen. The reaction mass is diluted with 137.5 cc. of anhydrous tetrahydrofurane and cooled to 0–3° C. and then mixed in the course of one hour with an anhydrous mixture of 6.25 cc. of ethyl acetate and 18.75 cc. of tetrahydrofurane, and, in the course of another hour, with a mixture of 2.3 cc. of water and 23 cc. of tetrahydrofurane, after which 1.0 g. of purified diatomaceous earth is added. The suspension is stirred for another 30 minutes at 0–3° C., filtered through a thin layer of diatomaceous earth and the filter rinsed with 225 cc. of tetrahydrofurane. The filtrate is evaporated under reduced pressure. The residue is crystallized from ether. It is the crude d,l-$\Delta^5$-3,3:20.20-bis-ethylenedioxy-11$\beta$,18,21-trihydroxy-pregnene which can be used as it is for the acetylation described below. The substance can be obtained in absolutely pure form by adsorption chromatography on 50 times its quantity of silica gel. It is eluted from the latter with ethyl acetate and crystallizes from ether in the form of small clusters of melting point 118–120° C./148–150° C. (dimorphism).

*Example 3*

To a solution of 808 mg. of (18→11)-lactone of d,l-$\Delta^5$ - 3,3;20,20 - bis - ethylenedioxy - 11$\beta$ - hydroxy - pregnene-18-acid in 33 cc. of anhydrous tetrahydrofurane are added in the course of 15 minutes 4.1 cc. of an 0.460 molar solution of lithium aluminum hydride in tetrahydrofurane. The mixture is stirred for another 3¾ hours at room temperature, and the opalescent solution then poured into a mixture of 18.8 cc. of 1-molar sodium potassium tartrate, 7.5 cc. of 0.5 molar tartaric acid and 26.5 g. of ice, and the vessel rinsed with 8.1 cc. of tetrahydrofurane. The whole is then concentrated to a volume of 15 cc. under reduced pressure. The aqueous suspension is then extracted with methylene chloride, the extract washed with 1-molar sodium potassium tartrate and with water, dried with sodium sulfate, and evaporated. The residue crystallizes practically completely from ether and is the crude d,l-$\Delta^5$-3,3;20,20-bis-ethylenedioxy - 11$\beta$,18 - dihydroxy - pregnene of melting point 150–155° C.

A solution of 612 mg. of crude d,l-$\Delta^5$-3,3;20,20-bis-ethylene dioxy-11$\beta$,18-dihydroxy-pregnene in 5.75 cc. of anhydrous pyridine is mixed with 3.35 cc. of acetic anhydride and the mixture is heated for 2 hours with exclusion of moisture in a bath of 65° C. The reaction solution is then evaporated under a high vacuum, the residue is dissolved in a small quantity of ether, and 680 mg. of crystalline crude d,l - $\Delta^5$ - 3,3;20,20 - bisethylenedioxy-11$\beta$-hydroxy-18-acetoxy-pregnene obtained.

680 mg. of the crude d,l-$\Delta^5$-3,3;20,20-bisethylenedioxy-11$\beta$-hydroxy-18-acetoxy-pregnene obtained as described in the preceding paragraph are covered with 17 cc. of 67% acetic acid and the mixture heated, while being agitated, for 30 minutes on a water bath in an atmosphere of nitrogen. After cooling and additing a total of 20 cc. of water, the reaction mixture is concentrated to about 3 cc., the aqueous residue extracted by agitation with methylene chloride, the extract washed with 0.5 N-sodium hydrogen carbonate and with water, dried with sodium sulfate, and evaporated. There are obtained in this manner 524 mg. of a crude product which is chromatographically separated by means of 140 sheets of Whatman paper No. 1 (18.5 x 45 cm.) using the system formamide/cyclohexane-benzene (1:2). The chromatogram occupying the full extent of the paper shows three strongly UV-absorbing zones. The uppermost zone, having an RF value of 0.12–0.23. is cut off, dried in a high vacuum for 16 hours, and then eluted with 20% and 50% aqueous tetrahydrofurane. The collected extract is concentrated to about 1/50 of its original volume and the concentrate extracted by agitation with benzene. The extracts are washed with a small amount of water, dried with sodium sulfate, and evaporated. There are obtained in this manner 189 mg. of a crystalline eluate which on crystallization from methylene chloride+ether yield 166 mg. of pure d,l-$\Delta^4$-3,20-dioxo-11$\beta$-hydroxy-18-acetoxypregnene of melting point 190.5–192.5° C.

A solution, prepared in an atmosphere of nitrogen with the exclusion of moisture, of 88 mg. of d,l-$\Delta^5$-3,3;20,20-bis-ethylene dioxy-11$\beta$,18-dihydroxy-pregnene in 2.0 cc. of benzene and 0.085 cc. of anhydrous pyridine is mixed dropwise in the course of 15 minutes while cooling with ice, with 0.70 cc. of trifluoracetic acid anhydride. When the addition is complete, the cooling bath is removed, and the reaction mixture stirred at room temperature for 5 hours. It is then poured into a mixture of 5 cc. of 2 N-sodium carbonate and 7.5 g. of ice, and extracted with benzene. The benzene extracts are washed with 0.5 N-phosphoric acid, with 2 N-sodium carbonate, and with water, the combined portions are dried with sodium sulfate and evaporated. From the benzene-free residue there are obtained on recrystallization from a 1:1-mixture of ether and petroleum ether 85 mg. of pure d,l-$\Delta^5$-3,3;20,20 - bis - ethylenedioxy - 11$\beta$,18 - bis - tri - fluoracetoxy-pregnene of melting point 196.5–199° C. (slight decomposition).

*Example 4*

0.1099 part by weight of the (18→11$\beta$)-lactone of d,l-$\Delta^4$-3,20-dioxo-11$\beta$,21-dihydroxy-pregnene - 18 - acid and 15.4 parts by volume of a 0.002 molar solution of para-toluenesulfonic acid in ethylene glycol are heated at 85–90° C., and 7 parts by volume of ethylene glycol are distilled off at the oil pump under 0.5–1 mm. pressure of mercury in the course of 8 hours. Under further reduced pressure the reaction mixture is then concentrated to a small residue, the suspension remaining in the flask is mixed with 7.7 parts by volume of 0.02 N-sodium hydrogen carbonate solution and extracted with methylene chloride. The extracts are washed with 0.02 N-sodium hydrogen carbonate solution and with water, dried with sodium sulfate and evaporated. By recrystallization of the solid residue from tetrahydrofurane and ether (1:4) there is obtained the (18→11$\beta$)-lactone of d,l-$\Delta^5$-3,3;20:20-(bis-ethylenedioxy)-11$\beta$:2-dihydroxy-pregnene-18-acid in the form of colorless, lustrous platelets melting at 261–264° C. (with slight decomposition).

To a solution of 0.1307 part by weight of the (18→11$\beta$)-lactone of d,l-$\Delta^5$-3:3;20:20-(bis-ethylenedioxy)-11$\beta$:21-dihydroxy-pregnene-18-acid in 7.84 parts by volume of anhydrous tetrahydrofurane there is added dropwise in the course of 15 minutes 0.730 part by volume of a 0.24 molar solution of lithium aluminum hydride in tetrahydrofurane. After stirring for 3¾ hours at room temperature the reaction mixture is poured into an ice-cold mixture of 3.5 parts by volume of 1-molar potassium sodium tartrate solution, 1.4 parts by volume of 0.5 N-tartaric acid solution and 10.5 parts by weight of ice, and the tetrahydrofurane is distilled off at 20–25° C. under reduced pressure. The precipitated reduction product is then taken up in a mixture of methylene chloride and ether (1:3), the extract is washed with 1-molar potassium sodium tartrate solution and water, dried with sodium sulfate and evaporated with the addition of ether. The colorless, crystallized residue is the 11$\beta$:18-cyclosemiacetal of d,l-$\Delta^5$-3:3;20:20-(bis-ethylenedioxy)-11$\beta$:21 - dihydroxy-18-oxo-pregnene. In contrast to the starting material, the substance shows no bands in the carbonyl region in the infrared spectrum.

A solution of 0.1472 part by weight of the crude 11$\beta$:18-cyclosemiacetal of d,l-$\Delta^5$-3:3;20:20-(bis-ethylenedioxy)-11$\beta$:21-dihydroxy-18-oxo-pregnene in 9.82 parts by volume of tetrahydrofurane is mixed with 0.99 part by volume of 1 N-hydrochloric acid, and the mixture is allowed to stand for 38 hours at room temperature in an oxygen-free nitrogen atmosphere. It is then poured on to 19.8 parts by volume of 0.1 N-sodium hydrogen carbonate solution, the tetrahydrofurane is distilled off under reduced pressure with the addition of 7.5 parts by volume of water and the resulting suspension is extracted with methylene chloride. The extract is washed with 0.1 N-sodium hydrogen carbonate solution and water, dried with sodium sulfate and evaporated. The crystalline residue is dissolved in chloroform and chromatographed by the partition method over cellulose. Formamide is used as stationary phase and chloroform as mobile phase. The first eluates contain weakly polar accompanying substances without any specific reducing capacity. On further eluation there follow fractions which extensively reduce both 3:3-dianisol-bis-4:4′ - (3:5 - diphenyl)-tetrazolium chloride and silver diamine solution. The latter are combined and recrystallized first from a mixture of acetone and ether (6:1) and then from a mixture of acetone and water (19:1) using methylene chloride each time as solution promoter. There is obtained the 11$\beta$:18-cyclosemiacetal of d:l-$\Delta^4$ - 3:18:20-trioxo-11$\beta$:21-dihydroxypregnene (d:l-aldosterone) as a monohydrate forming colorless prisms with slanting ends melting at 154° C./ 183–185° C.

The starting material used in this example may be prepared as follows:

A mixture of 1.932 parts by weight of the (18→11$\beta$)-lactone of d:l-$\Delta^5$-3:3-ethylenedioxy - 11$\beta$ - hydroxy-20-keto-pregnene-18-acid in 90 parts by volume of benzene and 40 parts by volume of a freshly prepared benzene solution which is 0.2 N with respect to sodium methylate and 0.5-molar with respect to oxalic acid dimethyl ester, is stirred for 16 hours with exclusion of moisture at room temperature. It is then poured into 80 parts by volume of 1-molar sodium dihydrogen phosphate solution and the whole extracted by shaking with chloroform-benzene mixture (1:1). The extract washed with water and dried with sodium sulfate is evaporated under reduced pressure and the completely crystalline residue freed from oxalic acid dimethyl ester under high vacuum at 40° C. By recrystallization of the crude product from anhydrous ether using methylene chloride as solution promoter, the (18→11$\beta$)-lactone of d:l-$\Delta^5$-3:3 ethylenedioxy - 11$\beta$ - hydroxy-20-oxo-pregnene-18-acid-21-oxalo-acid methyl ester is obtained in small needles of melting point 199–202° C. (with decomposition).

To a suspension, cooled to 0° C., of 0.945 part by weight of the (18→11$\beta$)-lactone of d:l-$\Delta^5$-3:3-ethylene-dioxy-11$\beta$-hydroxy-20-oxo-pregnene-18-acid - 21 - oxalo-acid methyl ester in 24.0 parts by volume of methanol there are added with exclusion of moisture and with stirring, 4.00 parts by volume of a 0.5 N-methanolic sodium methylate solution and after a clear solution has been produced the whole is treated within one minute first with 13.5 parts by volume of a methanolic 0.15-molar iodine solution and after stirring for a further 15 minutes with a second portion of 4.00 parts by volume of 0.5 N-methanolic sodium methylate solution. The mixture is then stirred for a further 3½ hours at 0° C. and then the separation of the iodo ketone completed by addition of 5.0 parts by volume of 0.5-molar sodium dihydrogen phosphate solution and 40 parts by volume of 50% aqueous methanol. The fine crystalline colorless substance, filtered with suction from the mother liquor constitutes the (18→11$\beta$)-lactone of d:l-$\Delta^5$ - 3:3 - ethylenedioxy-11$\beta$-hydroxy-20-oxo-21-iodo-pregnene-18-acid; this is advantageously without further purification subjected to the following reaction with potassium acetate.

The resulting crystalline (18→11β)-lactone of d:l-Δ⁵-3:3-ethylenedioxy-11β-hydroxy-20 - oxo - 21-iodo-pregnene-18-acid, after rinsing with 60 parts by volume of acetone, is added to potassium acetate freshly prepared from 5.01 parts by weight of potassium hydrogen carbonate and 3.00 parts by volume of glacial acetic acid and the whole is boiled for 1 hour in a nitrogen atmosphere on the water bath. After cooling, the majority of the acetone is removed by evaporation under vacuum, water is added to the residue and then extraction is carried out with ether-methylene chloride (3:1). The extracts, washed with 0.1 N-sodium bicarbonate and water, are combined, dried with sodium sulfate and evaporated. 25 parts by volume of benzene are poured over the residue and the whole heated for 3 minutes to boiling. On evaporation under vacuum a crystalline residue is obtained. It constitutes the crude (18→11β)-lactone of the d:l-Δ⁵-3:3-ethylenedioxy-11β-hydroxy-20-oxo-21 - acetoxypregnene-18-acid. The substance is completely free from halogen; it instantaneously reduced alkaline silver diamine solution.

0.793 part by weight of the crude (18→11β)-lactone of d:l-Δ⁵-3:3-ethylenedioxy-11β-hydroxy-20-oxo-21-acetoxypregnene-18-acid is covered with 40 parts by volume of 50% aqueous acetic acid and the whole heated for 45 minutes on a boiling water bath with passage of nitrogen. After cooling, the reaction mixture is evaporated under vacuum with the addition of 20 parts by volume of water to a small volume, then water added again and the whole extracted by shaking with an ether-methylene chloride mixture (3:1). The extract, washed with ice cold 0.5 N-sodium carbonate solution and water and dried with sodium sulfate, is evaporated and the almost completely crystalline residue subjected to distribution chromatography on cellulose. Formamide is used as stationary phase and cyclohexane-benzene mixture (1:1) as mobile phase. The first eluates consist of weakly polar impurities which are absorbent in ultra violet light. On further elution there follow first a comparatively small quantity of the (18→11β)-lactone of d:l-Δ⁴-3:20-dioxo-11β-hydroxypregnene-18-acid of melting point 217–219° C. and then eluates of strong reduction capacity for alkaline silver diamine solution. These latter are combined and recrystallized from acetone-ether (about 1:3) with the application of methylene chloride as solution promoter. The infra red absorption spectrum of the resulting (18→11β)-lactone of d:l-Δ⁴-3:20-dioxo-11β-hydroxy-21-acetoxy-pregnene-18-acid of melting point 244.5–247° C., when taken up in chloroform solution, agrees in every particular with that of the natural antipode obtained from aldosterone-21-monoacetate by oxidation with chromium trioxide as described in Example 1.

In a completely analogous way the optically active (18→11β)-lactone of Δ⁴-3:20-dioxo-11β-hydroxy-21-acetoxypregnene-18-acid is prepared from the optically active (18→11β)-lactone of Δ⁵-3:3-ethylenedioxy-11β-hydroxy-20-oxo-pregnene-18-acid obtained by total synthesis as described in our copending application Serial No. 770,015, filed October 28, 1958. The 3-ketal and the 21-acetoxy groupings can be hydrolized simultaneously in the following way:

0.358 part by weight of crude (18→11β)-lactone of d:l-Δ⁵-3:3-ethylenedioxy-11β-hydroxy-20 - oxo - 21-acetoxy-pregnene-18-acid is covered with 12.1 parts by volume of tetrahydrofurane. After the addition of 4.03 parts by volume of aqueous 4 N perchloric acid the mixture is shaken until the starting materials have dissolved completely. It is kept in the dark for 60 hours, then cooled in ice water, neutralized with 32.2 parts by volume of 0.5 N sodium bicarbonate solution, and the tetrahydrofurane is distilled off in vacuo. The aqueous suspension which remains behind is extracted by shaking with methylene chloride, the extract washed with 0.2 N sodium carbonate solution and water, dried with sodium sulfate, and evaporated. The crystalline residue is subjected to distribution chromatography on cellulose with formamide as the stationary phase and benzene as the mobile phase. The first eluates contain a weakly polar byproduct which absorbs ultraviolet light. On further elutriation there is obtained an insignificant quantity of the afore-described (18→11β) - lactone of d:l-Δ⁴-3:20 dioxo-11β-hydroxypregnene-18-acid of melting point 217–219° C. and then, as the principal portion, fractions having a strong reducing effect on an alkaline silver diamine solution. From these latter fractions there is obtained by recrystallization from a mixture of acetone and ether the (18→11β)-lactone of d:l-Δ⁴-3:20-dioxo-11β:21-dihydroxypregnene-18-acid of melting point 230–235° C.

*Example 5*

In a Claisen fractionating apparatus 0.1933 part by weight of (18→11β)-lactone of d,l-Δ⁵-3:3-ethylene dioxy-11β-hydroxy-20-oxo-pregnene-18-acid is covered with 25 parts by volume of a 0.002-molar solution of p-toluene sulfonic acid in purest ethylene glycol. At a bath temperature of 80–90° C. and a pressure of about 1 mm., within 5 hours about 12 parts by volume of ethylene glycol are distilled off. With reduction of the distillation pressure, the reaction mixture is finally concentrated to about 1 part by volume. After cooling, methylene chloride is added and the methylene chloride solution is washed three times with 0.02 N-sodium bicarbonate solution, eight times with water and dried over sodium sulfate. After evaporation of the solvent under vacuum at 40° C., 0.2182 part by weight is obtained of the crude (18→11β)-lactone of d,l-Δ⁵-3:3:20:20-bis-ethylene-dioxy - 11β - hydroxypregnene-18-acid, which after recrystallization from methylene chloride-ether melts at 248–250° C.

0.1023 part by weight of the (18→11β)-lactone of d,l-Δ⁵-3:3:20:20-bis-ethylenedioxy - 11β - hydroxypregnene-18-acid is dissolved in 6.4 parts by volume of tetrahydrofurane which has been distilled over lithium-aluminum hydride in a nitrogen atmosphere, and within 15 minutes 2.65 parts by volume of a 0.23-molar solution of lithium-aluminum hydride in tetrahydrofurane are added. Then the reaction solution is stirred for a further 3¾ hours at room temperature. For working up, the reaction mixture is poured into a mixture of 12 parts by volume of a molar Rochelle salt solution and 12 parts by weight of ice and the whole concentrated under vacuum at a bath temperature of 40° C. to about 12 parts by volume. Extraction is then carried out with ether-methylene chloride (3:1) and the extract washed with molar Rochelle salt solution and water and dried and the solvent evaporated under vacuum at a bath temperature of 40° C., whereby the d:l-Δ⁵-3:3:20:20-bis-ethylenedioxy-11β-hydroxy-18-oxo-pregnene or the 18:11-cyclosemiacetal is obtained which in its infra red absorption spectrum no longer exhibits any γ-lactone band. By ketal splitting there is obtained the d:l-Δ⁴-3:18:20-trioxo-11β-hydroxypregnene or the 18:11-cyclosemiacetal.

*Example 6*

0.02 part by weight of the d:l-Δ⁵-3:3:20:20-bis-ethylenedioxy-11β-hydroxy-18-oxo-pregnene or 18:11-cyclosemiacetal described in Example 5 is dissolved in 0.3 part by weight of acetic anhydride and the whole allowed to stand for 2 days at 25° C. It is then dissolved in pure ether, washed several times with 1.5 parts by volume of cold dilute hydrochloric acid, water, sodium bicarbonate solution and water, dried over sodium sulfate and evaporated under vacuum. The residue is chromatographed on 1.2 parts by weight of alumina of activity II. The first eluates with benzene-petrol ether (1:5) are rejected and the last together with those of benzene, contain the acetylated 18:11-cyclosemiacetal of d:l-Δ⁵-3:3:20:20-bis-ethylenedioxy-11β-hydroxy-18-oxo-pregnene.

The ketal splitting and working up are carried out in an analogous manner to that described in Example 4. As reaction product there is isolated the acetylated 18:11-cyclosemiacetal of d:l-$\Delta^4$-3:18:20-trioxo-11$\beta$-hydroxy-pregnene.

*Example 7*

0.0873 part by weight of the (18→11$\beta$)-lactone of d:l-$\Delta^5$ - 3:3:20:20 - bis - ethylenedioxy - 11$\beta$ - hydroxy - pregnene-18-acid described in the first paragraph of Example 5 is dissolved in 4.4 parts by volume of tetrahydrofurane which has been distilled over lithium aluminum hydride and there is added in the course of 15 minutes 0.45 part by volume of a 0.226 molar solution of lithium aluminum hydride in tetrahydrofurane. The reaction solution is stirred for another 3¾ hours at room temperature and then poured into a mixture of 2.1 parts by volume of a molar Rochelle salt solution, 0.81 part by volume of 0.5 N-tartaric acid solution, and 4.4 parts by weight of ice. The tetrahydrofurane is removed by careful concentration under vacuum. The precipitated crude product is taken up in methylene chlororide, the extract is washed with a molar Rochelle salt solution and water, dried with sodium sulfate, and evaporated under reduced pressure. The resulting 18:11-cyclosemiacetal of d:l-$\Delta^5$-3:3:20:20-bis - ethylenedioxy - 11$\beta$ - hydroxy - 18 - oxo - pregnene is recrystallized from a mixture of methylene chloride and ether and then has a melting point of 160–164° C. Unlike the starting material, the compound exhibits no carbonyl band in the infra red absorption spectrum.

*Example 8*

A solution of 0.0895 part by weight of the d:l-$\Delta^5$-3:3:20:20 - bis - ethylene - dioxy - 11$\beta$ - hydroxy - 18-oxo-pregnene or its 18:11-cyclosemiacetal in 0.84 part by volume of pyridine and 0.49 part by volume of acetic anhydride is heated at 60–65° C. for 2 hours. The reaction mass is then concentrated by evaporation under reduced pressure at a bath temperature of 25–30° C., and the crude product freed from highly volatile constituents by taking it up repeatedly in ether. The residue which crystallizes from ether is the acetylated 18:11-cyclosemiacetal of d:l - $\Delta^5$ - 3:3:20:20 - bis - ethylene - dioxy-11$\beta$-hydroxy-18-oxo-pregnene.

For ketal splitting, 0.0998 part by weight of the acetylated 18:11-cyclosemiacetal of d:l-$\Delta^5$-3:3:20:20-bis-ethylenedioxy-11$\beta$-hydroxy-18-oxo-pregnene are heated on the boiling water bath for 1¼ hours in a nitrogen atmosphere with 2.5 parts by volume of acetic acid of 67 percent strength. After cooling, the acetic acid is distilled off under vacuum, water being added, and the aqueous suspension is extracted by shaking with methylene chloride. The extract is washed with 0.5 N sodium bicarbonate solution and water, dried with sodium sulfate, evaporated under reduced pressure with the addition of ether, and the residue divided by distribution chromatography on cellulose. Formamide is used as the stationary phase, and a 1:1 cyclohexane-benzene mixture as the mobile phase. The first eluates consist of a weakly polar accompanying substance which absorbs ultraviolet light. On further elution another substance is obtained which also absorbs ultraviolet light but, unlike the former, reduces an alkaline silver diamine solution; it is the d:l-$\Delta^4$-3:18:20-trioxo-11$\beta$-hydroxy-pregnene or its 18:11-cyclosemiacetal and crystallizes from moist ether in the form of the hydrate of melting point 163.5–172.5° C.

The afore-described d:l-$\Delta^4$-3:18:20-trioxo-11$\beta$-hydroxy pregnene or its semiacetal, can be acetylated in the manner described in the first paragraph of Example 6.

*Example 9*

To a solution of 893 mg. of (18→11)-lactone of d:l-$\Delta^5$ - 3:20 - bis - ethylene - dioxy - 11$\beta$:21 - dihydroxy-pregnene-18-acid in 50 cc. of tetrahydrofurane (dehydrated with lithium-aluminum hydride and distilled) there are added 3.35 cc. of 0.40 molar lithium-aluminum hydride solution in tetrahydrofurane in the course of 15 minutes with stirring in a dry nitrogen atmosphere and the mixture then stirred for 3¾ hours at 20–23° C. The reaction mixture is then poured out with ice cooling into a mixture of 13.4 cc. of molar potassium sodium tartrate solution and 2.7 cc. of 0.5 N-tartaric acid, the tetrahydrofurane is distilled off under vacuum and the residual aqueous suspension extracted by shaking several times with methylene chloride. The extracts are washed with molar potassium sodium tartrate solution and water, combined, dried and evaporated. The residue is colorless and on taking up in ether immediately becomes completely solid. In order to determine the degree of conversion, a test portion of the crude product (5.00 mg.) is examined in an infra red spectrometer and the intensity of the still present lactone-CO-absorption band at 5.65$\mu$ compared with that of the pure diketal. Based on the integration values found, the proportion of unreacted starting material amounts to about 4%.

927 mg. of the above crude product yield from methylene chloride-tetrahydrofurane a small peak fraction of d:l-$\Delta^5$ - 3:20:bis - ethylene-dioxy - 11:18;18:21-(bis-oxido)-pregnene in the form of colorless, felted small needles of M.P. 265–267° C. The infra red absorption spectrum in methylene chloride solution shows practically nothing in the hydroxyl and double bond region. Acetylation of the mother liquor with pyridine and acetic anhydride and working up as in Example 10 below yields a mixture of the 18:21-di- and 21-mono-acetate-diketals described in that example.

*Example 10*

223 mg. of the (18→11)-lactone of d:l-$\Delta^5$-3:20-bis-ethylene-dioxy - 11$\beta$:21 - dihydroxy-pregnene - 18-acid are reduced exactly as described in Example 9 in tetrahydrofurane with lithium-aluminum hydride. When the reaction is complete, the solution is treated with 4.75 cc. of acetic anhydride and the whole stirred for 48 hours in a dry nitrogen atmosphere. The reaction mixture which has become turbid is then evaporated under vacuum at 20–25° C., in which operation toluene is added as entraining agent to remove the excess acetic anhydride. The semi-solid radical is covered with 100 cc. of molar potassium sodium tartrate solution and 100 cc. of methylene chloride and the closed flask shaken for 30 minutes. The aqueous phase is then separated off and extracted twice more with 50 cc. of methylene chloride each time. The organic solutions are washed with molar potassium sodium tartrate solution and with water, combined, dried with sodium sulfate and evaporated. The colorless residue crystallizes from ether. It is dissolved in 10 cc. of benzene and chromatography by the fractional elution method on 12.1 grams of silica gel ("Davison, Thru 200th. For elution 40 cc. per fraction are used of the following solvents:

Fraction 1+2 benzene
Fraction 3+4 benzene-ether-(99:1)
Fraction 5+6 benzene-ether-(95:5)
Fraction 7+8 benzene-ether-(75:25)
Fraction 9+10 benzene-ether-(50:50)
Fraction 11+12 ether
Fraction 13+14 ether-ethyl acetate-(99:1)
Fraction 15+16 ether-ethyl acetate-(95:5)
Fraction 17+18 ether-ethyl acetate-(75:25)
Fraction 19+20 ether-ethyl acetate-(50:50)

In fractions 1–8 only traces of amorphous material are found. The residues of fractions 9–16 crystallize on being taken up in ether and contain the majority of the initial material. They are first individually fractionally recrystallized from ether with methylene chloride as solution promoter. In this manner from fractions 9 and 10 a total quantity of 32.3 mg. of 18:21-diacetate is obtained in fine colorless small rods of M.P. 200–206.5° C. Infra red absorption in $CH_2Cl_2$: no (O—H); 5.75µ

(ester-C=O)

9.04µ (ketal).

On dissolving the 18:21-diacetate in methylene chloride followed by filtration and recrystallization from hot acetone, on account of the access of water partial hydrolysis to the 21-monoacetate (see below) sets in.

From fractions 12–15 a total quantity of 28.1 mg. of pure 21-monoacetate can be isolated in the above described manner in the form of colorless prisms with oblique ends of double melting point 182.5–186° C./198.5–201.5° C. Recrystallization from hot acetone does not change the melting point. Infra red absorption in $CH_2Cl_2$: 2.79/2.89µ (O=H); 5.73µ (ester-C=O); 9.05µ (ketal).

By the use of the corresponding quantities of the mixed anhydrides of formic acid and acetic acid, of propionic anhydride, trimethylacetyl chloride, cyclopentylpropionyl chloride, phenylpropionyl chloride or succinic anhydride there are obtained in a completely analogous manner the 18:21-di or 21-formate, -monopropionate, -trimethylacetate, -cyclopentyl propionate, -phenylpropionate and hemi-succinate of aldosterone-3:20-diketal.

*Example 11*

The d:l-21-O-acetyl-aldosterone can be obtained as follows:

(a) From pure 18:21-di-O-acetyl-diketals: 10.66 mg. of the diacetate described in Example 10 and 1.0 cc. of 90% acetic acid are heated in a nitrogen atmosphere for 15 minutes in an oil bath at 125° C. The reaction solution is evaporated after cooling with repeated addition of toluene and the solid residue, freed from toluene by evaporation with ether, is recrystallized from acetone. A total quantity of 4.20 mg. of pure d:l-21-O-acetyl-aldosterone are obtained in colorless fine prisms of M.P. 178–180° C. The mother liquor, after repeated treatment with boiling 90% acetic acid, evaporation and subsequent preparative paper chromatographic separation in the system formamide/cyclohexane-benzene (1:2) in the manner described below under (b), yields a further 1.63 mg. of M.P. 177–178° C.

(b) From pure 21-O-monoacetyl-diketal: A solution of 2.497 grams of the monoacetate described in Example 10 in 118 cc. of 90% acetic acid is boiled in a nitrogen atmosphere for 15 minutes on an oil bath. After cooling, the acetic acid is evaporated under an oil pump vacuum with the addition of a total quantity of 75 cc. of toluene, so that the acetic acid is completely removed, and the remaining toluene is finally driven off by evaporation with ether. From the crystalline residue there are obtained by double recrystallization from acetone as peak fraction 797 mg. of pure d:l-21-O-acetyl-aldosterone in colorless fine prisms of M.P. 178–180° C. The evaporation residue from the first mother liquor (991 mg.) is again treated for 15 minutes with boiling 90% acetic acid, the solution then evaporated as described above and the residue, dissolved in 38.5 cc. of methylene chloride, chromatographed on 350 sheets of formamide-soaked Whatman paper No. 1 (18.5 x 45 cm.) for 2½ hours in the system formamide/cyclohexane-benzene (1:2). After drying the sheets in the air for 24 hours, the strongly ultra violet absorbing zone of Rf-value 0.16 is cut out, the paper first further dried for 16 hours at 40° C. under high vacuum and then eluted with a total quantity of 1600 cc. of 20% aqueous tetrahydrofurane. The collected extract is evaporated under reduced pressure to a residual volume of about 200 cc. and the aqueous concentrate extracted by shaking several times with methylene chloride. The extracts, after being washed with water, are combined, dried with sodium sulfate and evaporated. The yellowish eluate which completely crystallizes from ether, when dry, weights 321 mg. In the same manner the evaporation residue from the second mother liquor (259 mg.) is paper chromatographically separated and yields 127 mg. of eluate. For purification, the 2 fractions are dissolved together in 45 cc. of tetrahydrofurane and the solution filtered through a column of 1.125 grams of active charcoal. The filtrate leaves on evaporation a colorless residue from which, by recrystallization from acetone, a further total quantity of 345 mg. of pure 21-monoacetate of M.P. 178–180° C. can be obtained.

The crystals obtained from acetone give on combustion analysis a too low C-value, which is due to a content of difficultly removable crystallization solvent which is detectable spectroscopically in the infra red. The substance also crystallizes from boiling benzene with solvent, but this is completely given off under vacuum at 125–130° C. in the course of 1½ hours.

The racemic 21-O-acetyl-aldosterone also exists in a solvent free modification melting at 204–206° C. which on being slowly heated forms the above described benzene-containing crystals particularly easily.

In an analogous manner, from the 18:21-di-O-acetyl-diketals of d- or l-aldosterone, the d- and l-21-O-acetyl-aldosterone respectively are obtained.

*Example 12*

To a solution of 40.25 mg. of d:l-21-O-acetyl-aldosterone in 1.25 cc. of methylene chloride 2.5 cc. of 0.05-molar potassium carbonate in 75% methanol are added all at once with swirling, the excess alkali neutralized after a reaction time of 4 minutes by throwing in a piece of solid carbon dioxide and thereupon the reaction solution concentrated under a water jet vacuum to a final volume of about 0.75 cc. During the concentration, after removal of the methylene chloride, a further 1.0 cc. of water is added. The resulting crystal suspension is filtered with suction followed by rinsing with a total quantity of 3.0 cc. of ice cold water and the crystallizate is dried under vacuum over calcium chloride. In this manner 31.15 mg. of practically pure d:l-aldosterone are obtained in felted platelets of M.P. 178–180° C.

As paper chromatographic analysis in the system propylene glycol/toluene shows, the preparation still contains a small quantity (about 3%) of a somewhat more slowly wandering, ultra violet absorbing impurity which likewise reduced tetrazolium blue. For separation, the material is dissolved in 1.60 cc. of methylene chloride and after being applied to 16 sheets of propylene glycol saturated Whatman paper No. 1 (size 18.5 x 45 cm.; washed with chloroform and methanol) chromatographed for 20 hours in the system propylene glycol/toluene. The main band is cut out and eluted with 20% aqueous tetrahydrofurane. The extract further worked up in the customary manner gives on recrystallization from methanol-water 15.7 mg. of pure d:l-aldosterone in colorless felted platelets which on slow heating above 120° C. are converted into compact crystals which finally melt at 187–204° C.

*Example 13*

A fine crystalline suspension of 402.5 mg. of d:l-21-O-acetyl-aldosterone in 125 cc. of a 0.1 molar solution of potassium bicarbonate in aqueous methanol of 80% strength is agitated in a nitrogen atmosphere at 20–23° C. until the starting material is completely dissolved. The resulting solution is then allowed to stand at the same temperature for 3 hours.

The reaction mass is then cooled by external cooling with ice, 23.0 cc. of ice-cold 0.5 N-acetic acid are added and the mixture is evaporated to a volume of about 10 cc. under reduced pressure at a bath temperature of 30–35° C. The crystallizate formed is allowed to stand for 15 minutes and separated from the mother liquor by filtering with suction and is then washed with 25 cc. of ice cold water and dried at room temperature. 323.4 mg. of practically pure d:l-aldosterone are obtained

What is claimed is:
1. A process for the preparation of new steroids, which comprises treating a compound of the formula

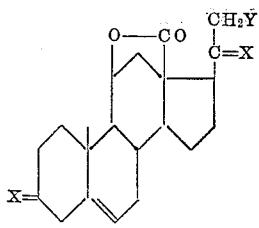

in which X stands for a lower alkylenedioxy group and Y for a member of the group consisting of a hydrogen atom, a free hydroxyl group and a hydroxyl group esterified with an organic carboxylic acid in an inert solvent with lithium aluminum hydride.

2. A process according to claim 1, wherein approximately one half of a mole to one fourth of a mole of lithium aluminum hydride per mol of steroid is used whereby a compound of the formula

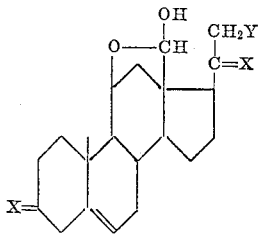

is formed, X and Y having the same meaning as in claim 1.

3. A process according to claim 1, whereby an excess of a lithium aluminum hydride is used whereby a compound of the formula

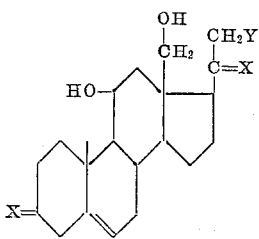

is formed, X and Y having the same meaning as in claim 1.

4. A steroid compound of the formula

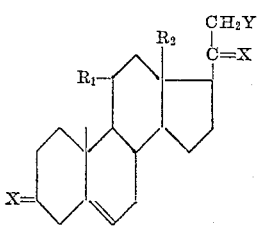

wherein X stands for a lower alkylenedioxy group, Y stands for a member of the group consisting of a hydrogen atom, a free hydroxyl group and an esterified hydroxyl group, $R_1$ for a member of the group consisting of a free hydroxyl group, and an esterified hydroxyl group and $R_2$ stands for a member of the group consisting of a free hydroxymethyl group, an esterified hydroxymethyl group, a free aldehyde, an acetalized aldehyde group, a free carboxyl group and a lactonized carboxyl group, said acetalized aldehyde group being acetalized with an 11-hydroxy group and lactonized carboxyl group being lactonized with an 11-hydroxy group.

5. The (18→11β)lactone of the $\Delta^5$-3,3,20:20-bis-ethylenedioxy-11β:21-dihydroxy-pregnene-18-acid.

6. The (18→11β)lactone of the $\Delta^5$-3,3,20:20-bis-ethylenedioxy-11β-hydroxy-pregnene-18-acid.

7. $\Delta^5$-3,3,20:20-bis-ethylenedioxy - 11β - hydroxy-18-oxo-pregnene of the formula

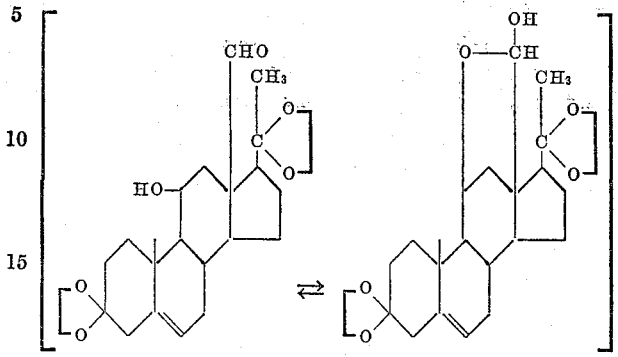

8. The 18-acetate of the compound of claim 7.

9. The $\Delta^5$-3,3,20:20-bisethylenedioxy - 11β:18:21 - trihydroxy-pregnene.

10. Process wherein in a member selected from the group consisting of an (18→11)-lactone of a $\Delta^5$-3:20-bis-alkylenedioxy-11β:21-dihydroxy-pregnene-18-acid and 21-esters thereof, the lactone group is reduced with lithium aluminum hydride to an aldosterone-3,20-bis-alkylene-ketal and the latter is treated with an acylating agent to yield an 18,21-diester.

11. Process as claimed in claim 10, wherein the 18,21-diester is hydrolyzed to the 21-monoester.

12. Process as claimed in claim 10, wherein the metal salt formed in the reduction with lithium aluminum hydride is treated directly with an acylating agent.

13. Process for the manufacture of aldosterone 21-esters, wherein the ketal groups in an aldosterone-3,20-bis-alkylene-ketal-21-ester are hydrolized by heating with an aliphatic carboxylic acid in aqueous medium.

14. An 18:21-diacylate of aldosterone-3:20-bis-alkylene ketal in which the acyl groups are derived from organic carboxylic acids.

15. The 18:21-diacetate of aldosterone-3:20-bis-ethylene ketal.

16. Aldosterone-3:20-bis-alkylene ketal acylated in position 21 with an organic carboxylic acid.

17. An 18-monoacylate of 21-desoxy-18-hydroxy-corticosterone-3:20-bis-alkylene ketal in which the acyl groups are derived from organic carboxylic acids.

18. An 11,18-diacylate of 21-desoxy-18-hydroxy-corticosterone-3:20-bis-alkylene ketal in which the acyl groups are derived from organic carboxylic acids.

19. $\Delta^5$-3:3,20:20 - bisethylenedioxy-11β:21-dihydroxy-18-acetoxy-pregnene.

20. $\Delta^5$-3:3,20:20-bisethylenedioxy - 11β - hydroxy-18-acetoxy-pregnene.

21. $\Delta^5$-3:3,20:20 - bisethylenedioxy - 11β:18 - bis(trifluoracetoxy)-pregnene.

22. $\Delta^4$-3,20-dioxo-11β-hydroxy-18-acetoxy-pregnene.

23. $\Delta^4$-3,20-dioxo-11β,18-dihydroxy-pregnene.

24. $\Delta^5$-3:3,20:20-bis-ethylenedioxy - 11β:21-dihydroxy-18-oxo-pregnene of the formula

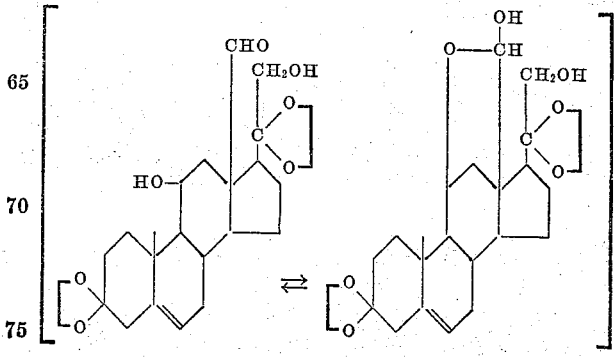

25. An 18-monoacylate of 18-hydroxy-corticosterone-3:20-bis-alkylene ketal, in which the acyl group is derived from an organic carboxylic acid.

26. An 18,21-diacylate of 18-hydroxy-corticosterone-3:20-bis-alkylene ketal, in which the acyl groups are derived from organic carboxylic acids.

27. An 11,18,21-triacylate of 18-hydroxy-corticosterone-3:20-bis-alkylene ketal, in which the acyl groups are derived from organic carboxylic acids.

References Cited in the file of this patent

UNITED STATES PATENTS

| | | |
|---|---|---|
| 2,852,529 | Poos | Sept. 16, 1958 |
| 2,862,925 | Reichstein et al. | Dec. 2, 1958 |
| 2,868,784 | Ruzicka et al. | Jan. 13, 1959 |
| 2,904,545 | Reichstein et al. | Sept. 15, 1959 |

UNITED STATES PATENT OFFICE
CERTIFICATE OF CORRECTION

Patent No. 3,014,904 December 26, 1961

Tadeus Reichstein et al.

It is hereby certified that error appears in the above numbered patent requiring correction and that the said Letters Patent should read as corrected below.

Column 9, line 53, for "11β:2-dihydroxy" read -- 11β:21-dihydroxy --.

Signed and sealed this 2nd day of October 1962.

(SEAL)
Attest:

ERNEST W. SWIDER
Attesting Officer

DAVID L. LADD
Commissioner of Patents